(12) United States Patent
Boyapalle et al.

(10) Patent No.: US 11,770,414 B2
(45) Date of Patent: Sep. 26, 2023

(54) INFORMATION HANDLING SYSTEMS AND METHODS TO PROVIDE A SECURE PLATFORM CONTROL POINT FOR CLOUD-NATIVE APPLICATIONS

(71) Applicant: DELL PRODUCTS L.P., Round Rock, TX (US)

(72) Inventors: Anantha K. Boyapalle, Cedar Park, TX (US); Vivek V. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/408,086

(22) Filed: Aug. 20, 2021

(65) Prior Publication Data
US 2023/0059261 A1 Feb. 23, 2023

(51) Int. Cl.
*H04L 9/40* (2022.01)
*G06F 9/54* (2006.01)
*H04L 67/51* (2022.01)

(52) U.S. Cl.
CPC .............. *H04L 63/20* (2013.01); *G06F 9/546* (2013.01); *H04L 67/51* (2022.05)

(58) Field of Classification Search
None
See application file for complete search history.

(56) References Cited

U.S. PATENT DOCUMENTS

| | | | | |
|---|---|---|---|---|
| 2012/0042016 A1* | 2/2012 | Kroeger | ................ | G06F 16/958 709/206 |
| 2012/0185874 A1* | 7/2012 | Cookson | ................ | H04L 67/10 719/313 |
| 2020/0042332 A1* | 2/2020 | Trocki | ................ | G06F 9/44526 |
| 2020/0193066 A1* | 6/2020 | Johns | ................ | G06F 21/6227 |
| 2021/0034694 A1* | 2/2021 | Peter | ................ | H04L 67/34 |

OTHER PUBLICATIONS

Wikipedia, "Brower Extension", Obtained from Internet Aug. 13, 2021, 4 pgs.
Wikipedia, "Trusted Platform Module", Captured from Internet Aug. 12, 2021, 27 pgs.
Wikipedia, "Inter-Process Communication", Captured from Internet Aug. 12, 2021, 5 pgs.
Ericlaw, "Browser Architecture: Web-to-App Communication Overview", Captured from Internet Apr. 19, 2021, 7 pgs.
Stackoverflow, "Interprocess Communication Between Browser Extension And Native Application", Captured from Internet Nov. 20, 2015, 1 pg.
Stackoverflow, "Check If My Website Is Open In AnotherTab", Captured from Internet May 7, 2021, 10 pgs.
Microsoft.com, "Interprocess Communications", Captured from Internet Apr. 1, 2021, 7 pgs.

* cited by examiner

*Primary Examiner* — Syed A Roni
(74) *Attorney, Agent, or Firm* — Egan, Enders & Huston LLP.

(57) ABSTRACT

Various embodiments of information handling systems and related methods provide a secure platform control point, which enables cloud-native applications to access the local hardware resources and platform capabilities of the information handling system. The embodiments disclosed herein provide the same level of security, manageability and compute/intelligence for cloud-native applications, as endpoint-native applications run locally on the information handling system.

19 Claims, 4 Drawing Sheets

INFORMATION HANDLING SYSTEMS AND METHODS TO PROVIDE A SECURE PLATFORM CONTROL POINT FOR CLOUD-NATIVE APPLICATIONS

FIELD

This invention relates generally to information handling systems, and more particularly, to information handling systems and related methods to provide a secure platform control point for cloud-native applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can be utilized to run workloads for a user. A workload generally includes applications and services that are executed to perform various tasks for a user. For example, a user's workload may include endpoint-native and/or cloud-native applications, as well as storage, backend services, and associated policies and security needed to run the applications. As part of the modern client experience, workloads can be run in a variety of modes, including an endpoint-native mode, a containerized endpoint-native mode or a cloud-native mode.

Endpoint-native and containerized endpoint-native modes utilize local hardware and software resources to run workloads on a local machine (e.g., a client system or endpoint device) and provide platform level attestation of security (e.g., TPM), manageability (e.g., CSME), and compute/intelligence (e.g., GNA, VPU, etc.) for endpoint-native applications (e.g., user and system management applications executed locally on the local machine). In contrast, cloud-native mode uses cloud-based hardware and software resources to run workloads/cloud-based applications on a remote server or cloud instance (e.g., a virtual machine or virtual server in a public or private cloud environment). Because cloud-based resources are used, cloud-native mode cannot provide platform level attestation of security, manageability, and compute/intelligence for cloud-native applications. This leads to sub-par security with attack surfaces, decreased cloud-native application performance and prevents cloud-native applications from being managed per browser tab.

As known in the art, clients system may utilize a web browser (such as, e.g., Google Chrome, Microsoft Edge, Mozilla Firefox, etc.) and network interface to access cloud-based applications running on a remote server or cloud instance. When workloads/cloud-based applications are run in cloud-native mode, access to cloud-based resources is often limited by the web browser/vendor. In some cases, the hardware restrictions established by the web browser may cause cloud-based applications to exhibit lower performance compared to endpoint-native manifestations of the same application. For example, whereas an endpoint-native Zoom application may be run locally on a client system in 1080p, cloud-native Zoom applications may be limited to 720p video encoding/decoding due to hardware restrictions (e.g., CPU loading) established by the web browser. In addition, hardware restrictions of the web browser may cause cloud-native applications to provide only a subset of the features or capabilities provided by endpoint-native manifestations of the same application.

SUMMARY OF THE INVENTION

The following description of various embodiments of information handling systems and related methods is not to be construed in any way as limiting the subject matter of the appended claims.

When conventional information handling systems run workloads/cloud-based applications in cloud-native mode, access to cloud-based resources is often limited by the web browser/vendor. The hardware restriction established by the web browser may cause cloud-based applications to exhibit lower performance compared to endpoint-native manifestations of the same application and/or provide only a subset of the features or capabilities provided by endpoint-native manifestations of the same application. In addition to deduced performance and capabilities, running workloads in cloud-native mode may provide other disadvantages to the user and/or the client system. For example, since cloud-native applications cannot utilize platform level capabilities of the client system, they cannot use contextual information collected by the client system to improve application and device security. Consider the case in which a user is running a cloud-native banking application in a web browser tab that requires access to a fingerprint reader (FPR). If the user's system is in an unsafe location, it would be desirable to restrict access to the FPR, or deploy higher security access to the FPR firmware, all the way to the REST layer of the web browser. Without the ability to utilize platform level capabilities, this is currently not achievable for cloud-native applications.

In contrast to conventional information handling systems, the present disclosure provides various embodiments of information handling systems and related methods to provide a secure platform control point, which enables cloud-native applications to access the local hardware resources and platform capabilities of the information handling system. In doing so, the embodiments disclosed herein provide the same level of security, manageability and compute/intelligence for cloud-native applications, as is currently provided for endpoint-native applications run locally on the information handling system.

According to one embodiment, an information handling system (IHS) is provided herein to provide a secure platform control point for cloud-native applications. The IHS described herein may generally include a host processor and a variety of software modules, which are executable by the host processor. In one embodiment, the IHS may include a web browser, a web browser extension and a kernel-mode virtual driver, all of which are executable by the host processor to perform various tasks and method steps described herein. For example, the web browser may be executable by the host processor to access a cloud-native application running on a remote system communicatively coupled to the IHS via a network. The web browser extension may be executable by the host processor to collect information about the cloud-native application. In one embodiment, the information collected by the web browser extension may identify the cloud-native application and a hardware resource requested by the cloud-native application.

The kernel-mode virtual driver may be executed by the host processor to: discover hardware resources and platform capabilities provided within the IHS; receive a request from the web browser extension to access the hardware resource requested by the cloud-native application; and provide the web browser access to a specific hardware resource within the IHS that corresponds to the hardware resource requested by the cloud-native application. In some embodiments, the kernel-mode virtual driver may be further executable by the host processor to: generate handles to software drivers that control the hardware resources provided within the IHS, and provide a handle to the web browser, via the web browser extension, for accessing the hardware resource requested by the cloud-native application. The handle may provide a data path to access a specific software driver, which controls the specific hardware resource within the IHS that corresponds to the hardware resource requested by the cloud-native application. In some embodiments, the web browser extension may destroy the handle provided by the kernel-mode virtual driver when the cloud-native application no longer requires access to the hardware resource.

In some embodiments, the IHS may also include an operating system (OS) service, which is executed by the host processor to: (a) transfer the request from the web browser extension to the kernel-mode virtual driver, and (b) transfer the handle from the kernel-mode virtual driver to the web browser extension. In one embodiment, the OS service may use interprocess communication (IPC) messages to: (a) transfer the request from the web browser extension to the kernel-mode virtual driver, and (b) transfer the handle from the kernel-mode virtual driver to the web browser extension.

In some embodiments, the kernel-mode virtual driver may be further executable by the host processor to communicate with the specific software driver to initiate an action on the specific hardware resource and control security for the action. In some embodiments, the kernel-mode virtual driver may be further executable by the host processor to control security for the action based on contextual information collected from the IHS. In some embodiments, the contextual information collected from the IHS may include one or more of the following: location information, user information, performance information, and network resource information.

In some embodiments, the kernel-mode virtual driver may be further executable by the host processor to use the platform capabilities provided within the HIS to control security for the action. In some embodiments, the platform capabilities may include one or more of the following: a trusted platform module (TPM) and a converged security and management engine (CSME).

According to another embodiment, a computer implemented method is provided herein to provide a secure platform control point for cloud-native applications. The computer implemented method may be performed by a host processor of an information handling system (IHS), and may generally include: accessing, via a web browser executed by the host processor, a cloud-native application running on a remote system communicatively coupled to the IHS via a network; collecting, via a web browser extension executed by the host processor, information about the cloud-native application, wherein the information identifies the cloud-native application and a hardware resource requested by the cloud-native application; discovering hardware resources and platform capabilities provided within the IHS; receiving a request from the web browser extension to access the hardware resource requested by the cloud-native application; and providing the web browser access to a specific hardware resource within the IHS that corresponds to the hardware resource requested by the cloud-native application. In some embodiments, said discovering, receiving and providing may be performed by a kernel-mode virtual driver executed by the host processor.

In some embodiments, said providing the web browser access to a specific hardware resource within the IHS that corresponds to the hardware resource requested by the cloud-native application may include: generating handles to software drivers that control the hardware resources provided within the IHS; and providing a handle to the web browser, via the web browser extension, for accessing the hardware resource requested by the cloud-native application. As noted above, the handle may provide a data path to access a specific software driver, which controls the specific hardware resource within the IHS that corresponds to the hardware resource requested by the cloud-native application. In some embodiments, the computer implemented method may further include destroying the handle provided to the web browser when the cloud-native application no longer requires access to the hardware resource.

In some embodiments, the computer implemented method may further include utilizing an operating system (OS) service executed by the host processor to: (a) transfer the request from the web browser extension to the kernel-mode virtual driver, and (b) transfer the handle from the kernel-mode virtual driver to the web browser extension.

In some embodiments, the computer implemented method may further include communicating with the specific software driver to initiate an action on the specific hardware resource and control security for the action. In some embodiments, the computer implemented method may further include collecting contextual information from the IHS, and controlling security for the action based on the contextual information. In some embodiments, said collecting contextual information from the IHS may include collecting one or more of the following: location information, user information, performance information, and network resource information.

In some embodiments, the computer implemented method may further include using the platform capabilities provided within the IHS to control security for the action. In one embodiment, the platform capabilities may include one or more of the following: a trusted platform module (TPM) and a converged security and management engine (CSME).

BRIEF DESCRIPTION OF THE DRAWINGS

Other advantages of the present disclosure will become apparent upon reading the following detailed description and upon reference to the accompanying drawings in which.

Figure 1:
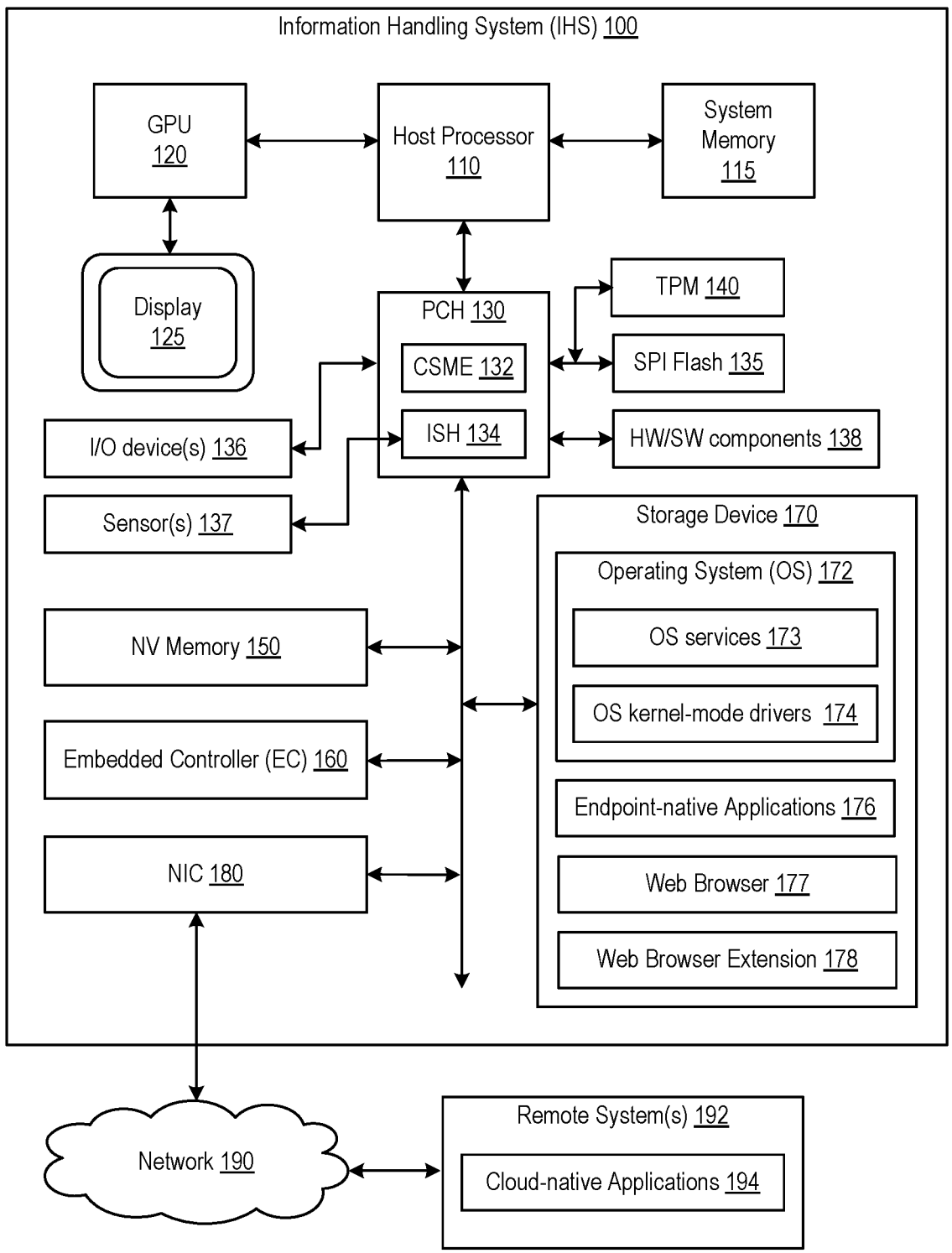
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

The present disclosure provides various embodiments of information handling systems and related methods to provide a secure platform control point, which enables cloud-native applications to access the hardware resources and platform capabilities of a client system. FIG. 1 illustrates one embodiment of an information handling system (IHS) 100 (e.g., a desktop computer, laptop computer, tablet computer, a smart phone, a smart device, an Internet of Things (IoT) device, etc.) in accordance with the present disclosure.

It is expressly noted that the IHS configuration shown in FIG. 1 is exemplary only, and that the methods disclosed herein to provide a secure platform control point for cloud-native applications may be implemented on any type and/or configuration of IHS. It will be further understood that while certain components of an information handling system are shown in FIG. 1 for illustrating embodiments of the present disclosure, the information handling system disclosed herein is not restricted to including only those components shown in FIG. 1 and described below.

As shown in FIG. 1, IHS 100 may generally include a host processor 110, a system memory 115, a graphics processor unit (GPU) 120, a display device 125, and a platform controller hub (PCH) 130, which in some embodiments, may include a converged security and management engine (CSME) 132 and/or an integrated sensor hub 134. The IHS 100 may further include a Flash memory 135 (e.g., an SPI Flash), one or more input/output (I/O) devices 136, one or more sensors 137, additional hardware/software components 138, a trusted platform module (TPM) 140, a computer readable non-volatile (NV) memory 150, an embedded controller (EC) 160, a computer readable storage device 170, and a network interface controller (NIC) 180. Other components not explicitly shown and described herein may also be included within the IHS 100, as is known in the art.

Host processor 110 may be generally configured to execute program instructions (computer program code) to perform a variety of different functions for the IHS. The host processor 110 may be implemented using a wide variety of programmable integrated circuits (e.g., a processor, such as a controller, microcontroller, microprocessor, ASIC, etc.) and/or programmable logic devices (e.g., a field programmable gate array "FPGA", complex programmable logic device "CPLD", etc.). According to one embodiment, host processor 110 may comprise at least one central processing unit (CPU) having one or more processing cores. As described in more detail below, host processor 110 may execute program instructions (or computer program code) to provide a secure platform control point for cloud-native applications. In some embodiments, the program instructions executed by the host processor 110 to provide a secure platform control point for cloud-native applications may be stored within computer readable storage device 170, as set forth in more detail below.

System memory 115 is coupled to host processor 110 and configured to store program instructions (or computer program code), which are executable by the host processor 110. System memory 115 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 120 is coupled to host processor 110 and configured to coordinate communication between the host processor and one or more display components of the IHS 100. In the illustrated embodiment, GPU 120 is coupled to display device 125 (e.g., a display screen or monitor) to provide visual images to the user. Although not shown herein, GPU 120 may also be coupled to one or more display ports to support additional display functions. The display ports (not shown) may include any suitable display port or interface including, but not limited to, a High-Definition Multimedia Interface (HDMI), a DisplayPort (DP) interface and/or a mini DisplayPort (miniDP or mDP) interface. Although shown in FIG. 1 as a separate integrated chip coupled to host processor 110 via a bus, GPU 120 may be integrated with the host processor as a silicon-on-chip (SoC) processor.

In some embodiments, IHS 100 may include additional processing devices such as, but not limited to, a graphics-derivative processor (such as a physics/gaming processor), a vision processing unit (VPU), a Gaussian Neural Accelerator (GNA) coprocessor, a digital signal processor (DSP), a security processor, and/or a trusted execution environment (such as Intel SGX, Intel TXT, a Global Platform TEE, Intel TXE, Intel CSME, AMD PSP, etc.). When included, the additional processing devices may provide additional compute and/or intelligence functionality to the system platform.

Platform controller hub (PCH) 130 is coupled to the host processor 110 and configured to handle I/O operations for the IHS 100. PCH 130 may include a variety of communication interfaces and ports for communicating with various IHS components, such as Flash memory 135 (e.g., an SPI Flash), I/O devices 136, sensors 137, TPM 140, NV memory 150, EC 160, storage device 170, and NIC 180. Examples of communication interfaces and ports that may be included within PCH 130 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In some embodiments, PCH 130 may include one or more subsystems configured to provide security and manageability functionality to the system platform. For example, PCH 130 may include a converged security and management engine (CSME) 132, as shown in FIG. 1. The CSME 132 is a subsystem embedded within the PCH 130 that provides remote-management capability to users and IT administrators, as well as additional security features that help safeguard the system and protect digital assets for users at the hardware level. Additional security and/or manageability capabilities may also be provided on the system platform, such as for example, TPM 140.

In some embodiments, an integrated sensor hub (ISH) 134 may be included within the PCH 130 for receiving and processing sensor data and other system data. Alternatively, an external sensor hub (not shown) could be communicatively coupled to the PCH 130 for receiving and processing sensor data and system data. When included within IHS 100, ISH 134 may be coupled to receive sensor data from one or more sensors 137. Examples of sensors 137 may include, but are not limited to, a gyroscope, global positioning system (GPS) sensor, a magnetometer, accelerometer, ambient light sensor, a camera, an eye tracking device or human gaze sensor, a time-of-flight sensor, a motion sensor, an infrared (IR) sensor, a temperature sensor, an acoustic sensor, a vibration sensor, a proximity sensor, a hall effect sensor, a hinge angle sensor, a 9 degrees of freedom (9-DOF) sensor, etc.

In some embodiments, the sensor data received from the one or more sensors 137 may be analyzed by the ISH 134 (or an external sensor hub) to obtain contextual information about the system and/or the user. In some embodiments, the sensor data may be analyzed to detect user presence (or absence) by determining if a user is physically present at the IHS 100. In other embodiments, the sensor data may be analyzed to determine other contextual information about the system and/or the user, such as but not limited to, location information (e.g., GPS data and other geographic information pertaining to the user and/or the user's client system), user information (e.g., calendar data, applications currently and previously used by the user, I/O devices used by the user, and other data pertaining to a user), performance information (e.g., processor performance when running user applications, number of concurrently running applications, and other data pertaining to system performance, etc.), network information (e.g., network access data, such as if the user is using public Wi-Fi without authentication, home Wi-Fi or corporate Wi-fi to access network resources, and other data pertaining to network resources), etc. In some embodiments, contextual information about the system and/or the user may be used herein to improve application and/or system security when running cloud-native applications.

I/O device(s) 136 enable the user to interact with IHS 100 and the software/firmware executing thereon. In some embodiments, one or more I/O devices 136 may be provided within IHS 100. In other embodiments, I/O device(s) 136 may be separate from the IHS and may interact with the IHS through a wired or wireless connection. Examples of I/O devices 136 include, but are not limited to, keyboards, keypads, touch screens, cameras, mice, scanning devices, voice or optical recognition devices, fingerprint reader (FPR), and any other devices suitable for entering or retrieving data or receiving user input.

Additional hardware/software resources 138 may be coupled to one or more of the communication interfaces and ports contained within PCH 130 to provide additional functionality to the IHS 100. Examples of additional hardware/software resources 138 include, but are not limited to, a video card, sound card, small system computer interface (SCSI) controller, hardware RAID controller, serial/parallel port card, IEEE 1394 cards, Thunderbolt™ card, a USB hub with USB controller hardware or software driver, network inbox driver, camera driver/camera input privacy, audio I/O devices (e.g., speaker privacy, keyboard shortcuts, etc.), SATA/eSATA controller card, PS/2 controller card, non-volatile memory card, PCH storage, CPU storage, etc.

Computer readable NV memory 150 is generally configured to store boot firmware (FW) 152 and other system firmware (not shown), and may include any suitable type of non-volatile memory and/or Flash memory device. Boot firmware 152 may generally include software and/or firmware modules for specifying hardware configuration settings, system date/time, boot sequence, etc., and may be implemented as a Basic Input/Output System (BIOS) and/or a Unified Extensible Firmware Interface (UEFI).

Embedded controller (EC) 160 may be configured to boot the information handling system and perform other functions. EC 160 may include read only memory (ROM), random access memory (RAM) and a processing device (e.g., a controller, microcontroller, microprocessor, ASIC, etc.) for executing program instructions stored within its internal ROM and RAM. For example, EC 160 may be configured to execute program instructions (e.g., a boot block) stored within its internal ROM to initiate a boot process for the IHS 100. Each time IHS 100 is powered on or rebooted, an IHS processing device (e.g., host processor 110 and/or EC 160) may execute boot firmware 152 to test and initialize IHS hardware components, perform a Power-On Self-Test (POST) to ensure the hardware configuration is valid and working properly, load an operating system (OS) from computer readable storage device 170, and/or perform a variety of other actions known in the art.

In some embodiments, a Trusted Platform Module (TPM) 140 may be included within the IHS 100 to ensure platform integrity, provide secure storage of sensitive information, and perform remote attestation and other cryptographic functions. As known in the art, a TPM 140 can be used to establish a strong root of trust for the IHS 100 by ensuring that the boot process starts from a trusted combination of hardware and software, and continues until the operating system has fully booted and applications are running. In addition to ensuring platform integrity, the TPM generates and uses cryptographic keys to verify or attest to the authenticity of various hardware and/or software components, and to bind and seal data/keys/applications to the platform. As such, TPM 140 provides platform level attestation of security to the system platform.

Computer readable storage device 170 may include any type of persistent, non-transitory computer readable storage device, such as one or more hard disk drives (HDDs) or solid-state drives (SSDs), and may be generally configured to store software modules and data. For example, computer readable storage device 170 may store an operating system (OS) 172 and other software modules such as, but not limited to, endpoint-native applications 176, web browser 177 and web browser extension 178. The software modules stored within the computer readable storage device 170 may be executed locally by the host processor 110 to perform various operations for the system and/or the user.

Figure 2:
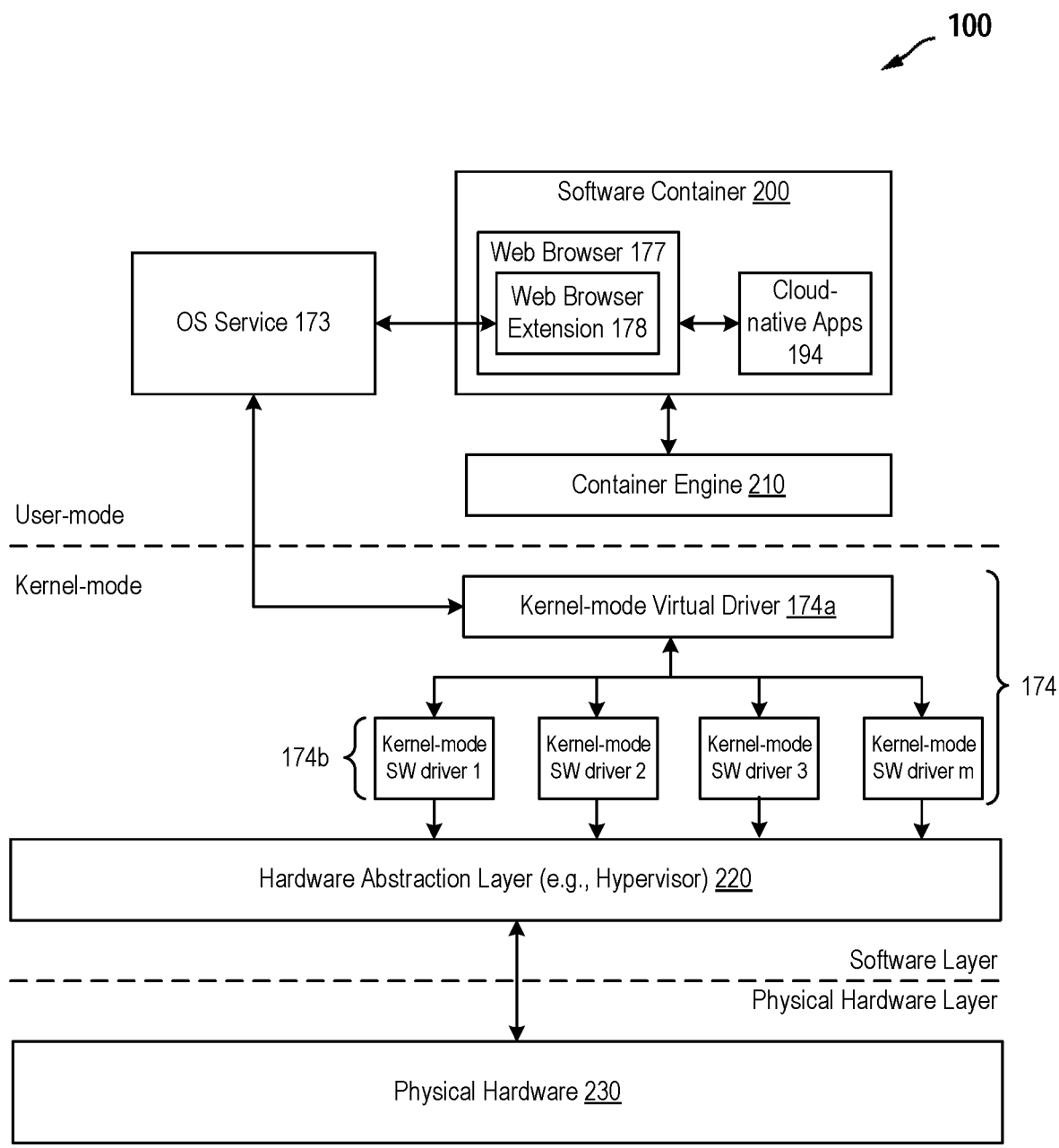
FIG. 2 is a conceptual block diagram illustrating various software and physical hardware components of the IHS shown in FIG. 1.

OS 172 may include a variety of OS services 173, OS kernel-mode drivers 174 and other components not specifically shown and described herein. As shown in FIG. 2 and described in more detail below, OS kernel-mode drivers 174 may include a plurality of software drivers 174*b* (e.g., kernel-mode SW drivers 1 . . . m), which control various hardware resources provided within the IHS 100, and a kernel-mode virtual driver 174*a* for communicating with, and controlling access to, the software drivers 174*b*. Examples of hardware resources having software drivers 174*b* include, but are not limited to, GPU 120 (and additional processing devices, such as a VPU, GNA, DSP, etc.), 110 devices 136, additional hardware/software resources 138, etc.).

A wide variety of endpoint-native applications 176 may be stored within the computer readable storage device 170 and executed locally by the host processor 110 to perform operations for the system and/or the user. Examples of endpoint-native applications 176 include, but are not limited to, local instances of Microsoft Office applications (e.g., Microsoft Word, Excel, Power Point, etc.), meeting applications (e.g., Zoom, Microsoft Teams, Skype, etc.), collaboration applications (e.g., Miro, Slack, etc.), design applications (e.g., Adobe Photoshop, Autodesk, etc.) and other user applications that are locally stored and executed.

NIC 180 enables IHS 100 to communicate with one or more remote systems 192 via a network 190. For purposes of this discussion, network 190 is indicated as a single collective component for simplicity. However, it is appreciated that network 190 may comprise one or more direct connections to other remote systems, as well as a more complex set of interconnections as can exist within a wide area network, such as the Internet. For example, network 190 may be a local area network (LAN), wide area network (WAN), personal area network (PAN), or the like, and the connection to and/or between IHS 100 and network 190 may be wired, wireless or a combination thereof.

In some embodiments, IHS 100 may utilize NIC 180 and network 190 to access one or more cloud-native applications 194 stored within one or more remote systems 192. Examples of cloud-native applications 194 include, but are not limited to, cloud instances of Microsoft Office 365 applications (e.g., Microsoft Word, Excel, Power Point, etc.), cloud meeting applications (e.g., Zoom, Microsoft Teams, Skype, etc.), cloud collaboration applications (e.g., Miro, Slack, etc.), cloud design applications (e.g., Adobe Creative Cloud, Autodesk cloud services, etc.) and other cloud-native applications and services, which are stored/executed on a remote system 192 and accessed via the network 190. In some embodiments, a user may utilize web browser 177 (e.g., Google Chrome, Microsoft Edge, Mozilla Firefox, etc.) to access various websites, cloud-native applications 194 and/or services.

As noted above, user workloads can be run in a variety of different modes, including an endpoint-native mode, a containerized endpoint-native mode or a cloud-native mode. In endpoint-native and containerized endpoint-native modes, endpoint-native applications 176 are executed locally on the IHS 100 using the hardware/software resources and platform capabilities of the IHS. In conventional information handling systems, cloud-native applications 194 run in cloud-native mode are executed on a remote system 192 using the cloud-based hardware/software resources of the remote system, and are accessed via a web browser 177 and network interface. Since conventional IHSs do not provide a platform control point for cloud-native applications 194, conventional IHSs cannot: (a) utilize local hardware/software resources of the IHS to improve cloud-native application performance, (b) provide platform level attestation of security, manageability, and compute/intelligence for cloud-native applications, or (c) use contextual information collected by the IHS to improve application and device security. This leads to sub-par security with attack surfaces, decreased performance of cloud-native applications and prevents cloud-native applications from being managed per browser tab.

To overcome the above-mentioned problems, the present disclosure provides various embodiments of information handling systems and related methods to provide a secure platform control point for cloud-native applications. The IHS 100 shown in FIGS. 1 and 2 represents one embodiment of an information handling system that utilizes the techniques described herein to provide a secure platform control point for cloud-native applications 194. By providing a secure platform control point for cloud-native applications 194, IHS 100 enables cloud-native applications 194 to utilize the local hardware/software resources and platform capabilities provided within the IHS 100. This improves the way IHS 100 functions by providing the same level of security (e.g., TPM 140), manageability (e.g., CSME 132), and compute/intelligence (e.g., GNA, VPU, etc.) for cloud-native applications 194, as is currently provided for endpoint-native applications 176 run locally on the IHS 100.

The techniques described herein may generally be implemented in software, or computer program instructions, which are locally stored and executed within an information handling system, such as IHS 100. FIG. 2 provides a conceptual block diagram of various software and physical hardware components of an information handling system (IHS 100) that may utilize the techniques described herein to provide a secure platform control point for cloud-native applications. It will be understood that, while certain software and physical hardware components of the IHS 100 are shown in FIG. 2 for illustrating embodiments of the present disclosure, the information handling system disclosed herein is not restricted to including only those components shown in FIG. 2 and described below. It will be further understood that the IHS configuration shown in FIG. 2 is exemplary only, and that the methods disclosed herein may also be implemented on an information handling system having a substantially different configuration.

In the embodiment shown in FIG. 2, IHS 100 includes a software layer, which is abstracted from, yet shares resources within, the physical hardware components of the IHS. The software layer shown in FIG. 2 includes user-mode applications and services, kernel-mode drivers 174, and a hardware abstraction layer 220 (e.g., a hypervisor), which serves as an interface between the kernel mode drivers 174 and the underlying physical hardware layer 230. A wide variety of hardware resources may be included within the physical hardware layer 230. In one embodiment, physical hardware layer 230 may include host processor 110, system memory 115, GPU 120, PCH 130, SPI Flash 135, I/O devices 136, sensors 137, additional HW/SW components 138, TPM 140, NV computer readable memory 150, EC 160, computer readable storage device 170 and NIC 180, as shown in FIG. 1. It is recognized, however, that the physical hardware layer 230 may include other hardware resources not shown in FIG. 1, as is known in the art.

The user-mode applications and services shown in FIG. 2 include OS service 173, web browser 177, web browser extension 178 and cloud-native applications 194. As described in more detail below, the web browser 177 may be executed by host processor 110 to access a cloud-native application 194 running on a remote system 192, which is communicatively coupled to the IHS 100 via a network 190. While cloud-native application 194 is in use, the web browser extension 178 may be executed by host processor 110 to collect information about the cloud-native application. For example, the information collected by the web browser extension 178 may identify the cloud-native application 194 (such as the name and/or type of application) and at least one hardware resource (e.g., a fingerprint reader, camera, video encoder/decoder, processing device, etc.) requested by the cloud-native application 194 to perform various functionality. After collecting information about the cloud-native application 194, the web browser extension 178 may send a request to kernel-mode virtual driver 174*a* (via OS service 173) to access the hardware resource(s) requested by the cloud-native application 194.

In the particular embodiment shown in FIG. 2, web browser 177, web browser extension 178 and cloud-native applications 194 are packaged within a software container 200 for execution on a container engine 210 (e.g., a Docker Engine). As known in the art, software containers are software packages that include everything needed to the run the containerized applications, including the application program code and all dependencies (e.g., runtime, system tools, system libraries and settings). As such, packaging the web browser 177, web browser extension 178 and cloud-native applications 194 within software container 200 enables the containerized applications to run the same, regardless of the underlying infrastructure. Although containerized applications are sometimes beneficial, the present disclosure is not strictly limited to such an embodiment. In other embodiments, software container 200 and container engine 210 may be omitted, and the web browser 177, web browser extension 178 and cloud-native applications 194 may be executed as stand-alone, user-mode applications.

Unlike user-mode applications, kernel-mode drivers 174 have unrestricted access to the underlying physical hardware layer 230. In the embodiment shown in FIG. 2, the kernel-mode drivers 174 include a plurality of kernel-mode software drivers 174*b* (e.g., kernel-mode SW drivers 1 . . . m) for controlling various hardware resources provided within the IHS 100, and a kernel-mode virtual driver 174*a* for communicating with, and controlling access to, the kernel-mode software drivers 174*b*. In addition to controlling access to the kernel-mode software drivers 174*b*, the kernel-mode virtual driver 174*a* provides a secure platform control point for cloud-native applications 194 by: (a) discovering the hardware resources and platform capabilities provided within the IHS 100, (b) providing cloud-native applications 194 access to the local hardware resources based on context, and (c) utilizing platform capabilities to provide platform level attestation of security, manageability, and compute/intelligence for cloud-native applications.

In some embodiments, kernel-mode virtual driver 174*a* may use a variety of techniques to discover the hardware resources and platform capabilities provided within the IHS 100. For example, the kernel-mode virtual driver 174*a* may discover the hardware resources and platform capabilities provided within the IHS 100 by using known Microsoft Windows enumerations (e.g., Windows Management Instrumentation (WMI) over Advanced Configuration Power Interface (ACPI)), or through register reads from hardware devices that are readable through Inter-Integrated Circuit (I2C), General Purpose Input/Output (GPIO), etc. Another way for the kernel-mode virtual driver 174*a* to discover the hardware resources and platform capabilities provided within the IHS 100 is to submit a service ID of the IHS to a cloud service, which provides a list of hardware resources present within the IHS. In some embodiments, the kernel-mode virtual driver 174*a* may use one of the above-mentioned techniques (or another well-known technique) to detect and determine the identity of the host processor 110, system memory 115, GPU 120, PCH 130, SPI Flash 135, I/O devices 136, sensors 137, additional HW/SW components 138, TPM 140, NV computer readable memory 150, EC 160, computer readable storage device 170 and NIC 180 shown in FIG. 1.

In addition to identifying the hardware resources included within the IHS 100, the kernel-mode virtual driver 174*a* may also determine their capabilities. For example, the kernel-mode virtual driver 174*a* may determine that the host processor 110 is an Intel i9 X-series host processor with 10 processing cores, 3.7-4.5 GHz processing speed and 19.25 MB cache, the computer readable storage device 170 is a Western Digital Black 1 TB SSD with 600 GB remaining storage, etc. In some embodiments, the kernel-mode virtual driver 174*a* may use a system identifier (such as, e.g., a Dell Digital ID) to determine if the hardware resources identified by the kernel-mode virtual driver 174*a* are the same hardware resources that were originally shipped with the IHS 100.

After the hardware resources and platform capabilities are discovered, the kernel-mode virtual driver 174*a* may receive a request from the web browser extension 178 (via the OS service 173) for accessing at least one hardware resource requested by a cloud-native application 194. Upon receiving the request, the kernel-mode virtual driver 174*a* may provide a response back to the web browser extension 178 (via the OS service 173), which enables the web browser 177 to access a specific hardware resource within the IHS 100 which corresponds to the hardware resource(s) requested by the cloud-native application 194. In doing so, the kernel-mode virtual driver 174*a* enables the cloud-native application 194 to use a local hardware resource within the IHS 100, instead of the cloud-based resources specified by the web browser 177.

In some embodiments, the kernel-mode virtual driver 174*a* may enable a cloud-native application 194 to access to the local hardware resources of the IHS 100 by generating handles to the kernel-mode software drivers 174*b* that control access to the local hardware resources. Each handle provides a data path to a specific kernel-mode software driver 174*b* that controls access to a specific hardware resource within the IHS 100. When web browser 177 is used to access a cloud-native application 194, the web browser extension 178 collects information about the cloud-native application 194 in use (e.g., the identity of the cloud-native application 194 and the hardware resource(s) requested by the cloud-native application 194), and uses the collected information to generate a message, which is provided to the kernel-mode virtual driver 174a via the OS service 173.

The message includes a request to access the hardware resource(s) requested by the cloud-native application 194. Upon receiving the request, the kernel-mode virtual driver 174a may provide handle(s) back to the web browser 177, via the OS service 173 and web browser extension 178, for accessing the hardware resource(s) requested by the cloud-native application 194. As noted above, each handle may provide a data path to a specific kernel-mode software driver 174b that controls access to a specific hardware resource within the IHS 100. By providing handle(s) to the web browser 177, the kernel-mode virtual driver 174a enables the cloud-native applications 194 to utilize the local hardware resources of the IHS 100, instead of the cloud-based resources specified by the web browser 177. In doing so, the kernel-mode virtual driver 174a (i.e., the platform control point) enables cloud-native applications 194 to perform on par with endpoint-native manifestations of the same application. When the cloud-native applications 194 no longer require access to the hardware resource(s), the web browser extension 178 may destroy the handle(s) provided by the kernel-mode virtual driver 174a.

In addition to providing handle(s) to local hardware resources, the kernel-mode virtual driver 174a communicates with the kernel-mode virtual driver(s) 174a to initiate actions on the local hardware resource(s) and control security for the action(s). Examples of actions that may be initiated on local hardware resources include, but are not limited to, throttle network uplink/downlink bandwidth, change network Quality of Service (QoS), cut off camera input access, add blur or other pre-processing to camera input stream, mute audio input (mic mute), cut off access to USB devices to prevent security surface attacks, etc. Other actions not specifically mentioned herein may also be initiated on the local hardware resources.

In some embodiments, the kernel-mode virtual driver 174a may use contextual information collected from the IHS 100 to control security for the action(s) initiated on the local hardware resource(s). A wide variety of contextual information may be used to control security for the action(s). For example, the contextual information collected from the IHS 100 may include, but is not limited to, location information (e.g., GPS data and other geographic information pertaining to the user and/or the user's client system), user information (e.g., user absence/presence, calendar data, applications currently and previously used by the user, I/O devices used by the user, and other data pertaining to a user), performance information (e.g., processor performance when running user applications, number of concurrently running applications, and other data pertaining to system performance, etc.), network information (e.g., network access data, such as if the user is using public Wi-Fi without authentication, home Wi-Fi or corporate Wi-fi to access network resources, and other data pertaining to network resources), etc. In some embodiments, the kernel-mode virtual driver 174a may restrict access to a local hardware resource, or may deploy higher security access to the kernel-mode software driver 174 controlling the local hardware resource, if the contextual information collected from the IHS 100 indicates that the IHS is in an unsafe location, using a public Wi-Fi without authentication, etc.

In some embodiments, the kernel-mode virtual driver 174a may use the platform capabilities provided within the IHS 100 to control security for the action(s) initiated on the local hardware resource(s). For example, the kernel-mode virtual driver 174a may use the TPM 140 to revoke platform privileges, keys, etc. if a security issue is detected. The kernel-mode virtual driver 174a may also use other platform capabilities provided within the IHS 100 to provide platform level attestation of security, manageability, and compute/intelligence for cloud-native applications 194. In one example, the kernel-mode virtual driver 174a may use CSME 132 to provide platform level attestation of security and manageability to cloud-native applications 194. In another example, the kernel-mode virtual driver 174a may use a VPU, GNA, or other processing device (not shown) to provide additional compute/intelligence to cloud-native applications 194.

The OS service 173 shown in FIG. 2 acts as an intermediary between the web browser extension 178 and the kernel-mode virtual driver 174a. For example, the OS service 173 may be executed by the host processor 110 to: (a) transfer the request from the web browser extension 178 to the kernel-mode virtual driver 174a, and (b) transfer the handle(s) from the kernel-mode virtual driver 174a to the web browser extension 178. In some embodiments, OS service 173 may use interprocess communication (IPC) messages and cryptographic challenge/response mechanisms to transfer the information securely between the web browser extension 178 and the kernel-mode virtual driver 174a.

The information handling system 100 shown in FIGS. 1 and 2 improves upon conventional information handling systems by providing: (a) a web browser extension 178 for collecting information about a cloud-native applications 194, (b) a kernel-mode virtual driver 174a (i.e., a secure platform control point), which enables cloud-native applications 194 to access the local hardware resources and platform capabilities of the IHS based on context, and (c) an OS service 173 for securely transferring information between the web browser extension 178 and the kernel-mode virtual driver 174a. In doing so, IHS 100 provides the same level of security, manageability, and compute/intelligence for cloud-native applications 194, as is currently provided for endpoint-native applications 176 run locally on the IHS.

Figure 3:
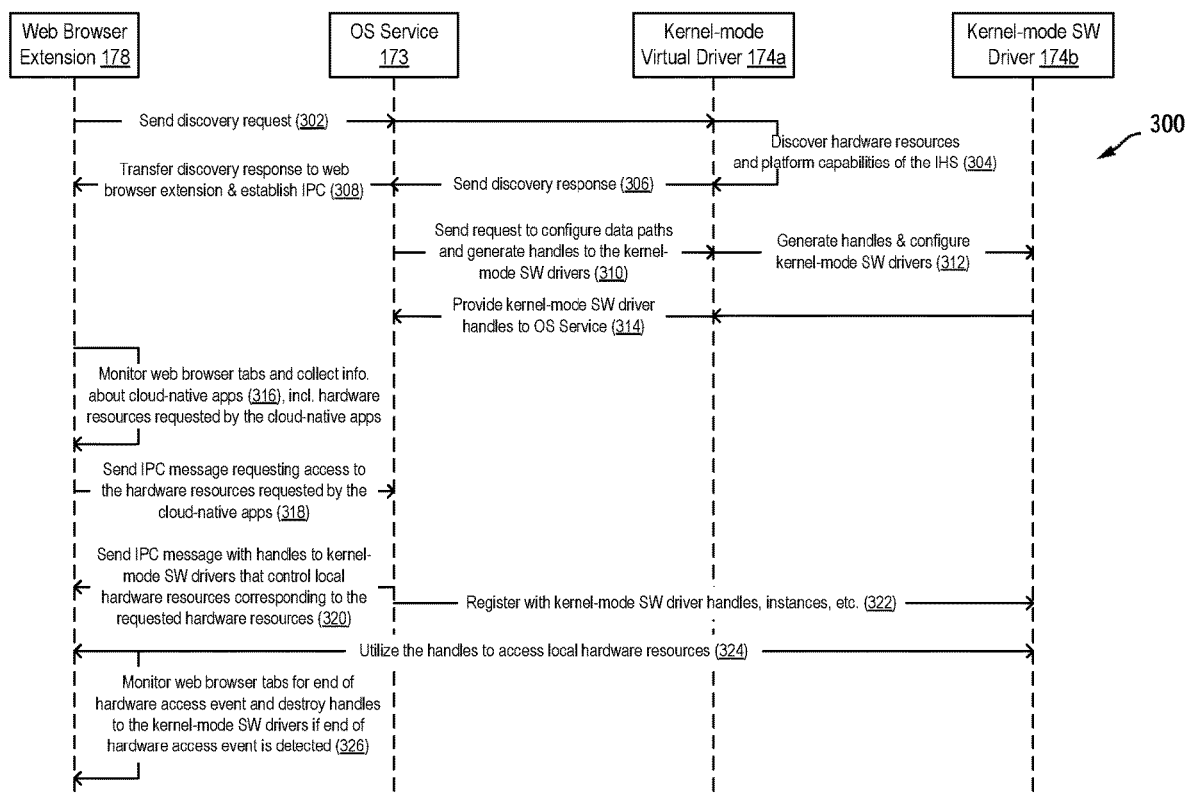
FIG. 3 is a process flow diagram illustrating communication between and functionality provided by the software components shown in FIG. 2.

As noted above and shown in FIGS. 1 and 2, the techniques described herein may generally be implemented in software, or computer program instructions, which are locally stored and executed within the IHS 100. In the embodiments illustrated in FIGS. 1 and 2, the techniques described herein are performed by a web browser extension 178, a kernel-mode virtual driver 174a, and an OS service 173 which acts as an intermediary to transfer information securely between the web browser extension 178 to the kernel-mode virtual driver 174a. FIG. 3 illustrates one example of a process flow 300 between the software components described herein.

The process flow 300 shown in FIG. 3 may generally begin when a web browser 177 is used to access one or more cloud-native applications 194, as shown in FIG. 2 and described above. The web browser extension 178 is activated when at least one cloud-native application 194 is running within a web browser tab. When activated, the web browser extension 178 sends a discovery request (in step 302) to the kernel-mode virtual driver 174a via the OS service 173. Upon receiving the discovery request, the kernel-mode virtual driver 174a determines the hardware resources and platform capabilities provided within the IHS 100 (in step 304), and sends a discovery response including the discovered resources and platform capabilities back to the OS service 173 (in step 306). In step 308, the OS service 173 transfers the discovery response to the web browser extension 178 and establishes a secure communication channel (e.g., IPC) between the OS service 173, the web browser extension 178 and the kernel-mode virtual driver 174a.

In step 310, the OS service 173 sends a request to the kernel-mode virtual driver 174a to configure data paths and generate handles to the plurality of kernel-mode software drivers 174b. Upon receiving the request from the OS service 173, the kernel-mode virtual driver 174a generates the handles and configures the kernel-mode software drivers 174b (in step 312) and provides the handles back to the OS service 173 (in step 314). As noted above, each handle generated by the kernel-mode virtual driver 174a (in step 312) may provide a data path to a specific kernel-mode software driver 174b that controls access to a specific hardware resource within the IHS 100.

In step 316, the web browser extension 178 monitors the web browser tab(s) and collects information about the cloud-native application(s) 194 running within the web browser tab(s). As noted above, the information collected by the web browser extension 178 (in step 316) may identify the cloud-native application(s) 194 and the hardware resource(s) requested by the cloud-native applications. After collecting information about the cloud-native application 194 (in step 316), the web browser extension 178 sends an IPC request message to OS service 173 requesting to access the hardware resource(s) requested by the cloud-native application(s) 194 (in step 318). In step 320, the OS service 173 sends an IPC response message back to the web browser extension 178. The IPC response message may include one or more handles to kernel-mode software driver(s) 174b, which control local hardware resource(s) corresponding to the hardware resource(s) requested by the cloud-native application(s) 194.

After the appropriate handles are provided to the web browser extension 178, OS service 173 (or alternatively, the kernel-mode virtual driver 174a) may register with the kernel-mode software driver handles, instances, etc. (in step 322). Registering the handles, instances, etc. (in step 322) enables the cloud-native applications 194 to use the handles, which were provided to the web browser extension in step 320, to access the kernel-mode software drivers 174b and local hardware resources controlled thereby (in step 324). In step 326, the web browser extension 178 monitors the web browser tab(s) to detect an end of hardware event, and destroys the handle(s) to kernel-mode software driver(s) 174b if an end of hardware access event is detected.

Figure 4:
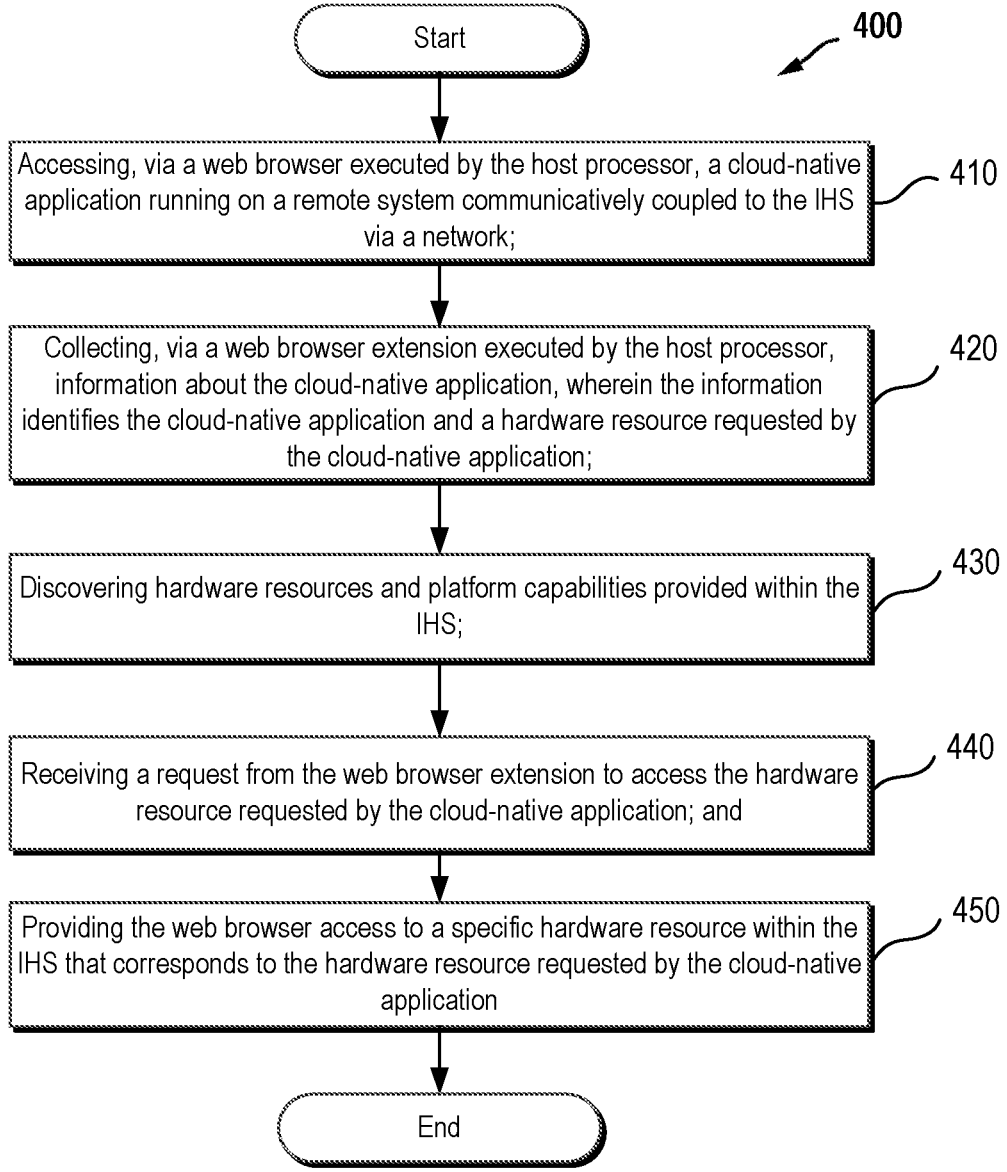
FIG. 4 is a flowchart diagram illustrating one embodiment of a method that utilizes the techniques described herein to provide a secure platform control point for cloud-native applications.

FIG. 4 illustrates one embodiment of a method 400 that utilizes the techniques described herein to provide a secure platform control point for cloud-native applications. The method 400 shown in FIG. 4 is a computer implemented method performed by a host processor of an information handling system (IHS). For example, the computer implemented method 400 may be performed by host processor 110 executing program instructions contained within kernel-mode virtual driver 174a and web browser extension 178. In some embodiments, host processor 110 may execute program instructions contained within OS service 173 to perform one or more of the method steps disclosed herein.

The computer implemented method 400 shown in FIG. 4 improves the way in which an information handling system (such as IHS 100) functions, in at least one respect, by providing a secure platform control point for cloud-native applications. By providing a secure platform control point for cloud-native applications, the computer implemented method 400 described herein enables IHS 100 to: (a) utilize local hardware/software resources of the IHS to improve cloud-native application performance, (b) provide platform level attestation of security, manageability, and compute/intelligence for cloud-native applications, and (c) use contextual information collected by the IHS to improve application and device security. A skilled artisan having benefit of this disclosure may recognize other ways in which the computer implemented method described herein may be used to improve the functioning of an information handling system, such as IHS 100.

It will be recognized that the embodiment shown in FIG. 4 is merely exemplary and additional methods may utilize the techniques described herein. Further, additional steps may be added to the method shown in the FIG. 4 as the steps described are not intended to be exclusive. Moreover, the order of the steps is not limited to the order shown in FIG. 4 as different orders may occur and/or various steps may be performed in combination or at the same time.

In some embodiments, the computer implemented method 400 may begin by accessing, via a web browser executed by the host processor, a cloud-native application running on a remote system communicatively coupled to the IHS via a network (in step 410), and collecting, via a web browser extension executed by the host processor, information about the cloud-native application (in step 420). As noted above, the information collected by the web browser extension (in step 420) may identify the cloud-native application and a hardware resource requested by the cloud-native application. Next, the computer implemented method 400 may include discovering the hardware resources and platform capabilities provided within the IHS (in step 430), receiving a request from the web browser extension to access the hardware resource requested by the cloud-native application (in step 440), and providing the web browser access to a specific hardware resource within the IHS that corresponds to the hardware resource requested by the cloud-native application (in step 450). In some embodiments, the steps of discovering (step 430), receiving (step 440) and providing (step 450) may be performed by a kernel-mode virtual driver executed by the host processor.

In some embodiments, providing the web browser access to a specific hardware resource within the IHS that corresponds to the hardware resource requested by the cloud-native application (step 450) may include: generating handles to software drivers that control the hardware resources provided within the IHS, and providing a handle to the web browser, via the web browser extension, for accessing the hardware resource requested by the cloud-native application. As noted above, the handle provided to the web browser may provide a data path to access a specific software driver, which controls the specific hardware resource within the IHS that corresponds to the hardware resource requested by the cloud-native application.

The computer implemented method 400 disclosed herein is not strictly limited to the method steps shown in FIG. 4 may include additional and/or alternative method steps. For example, some embodiments of the computer implemented method 400 may include destroying the handle provided to the web browser when the cloud-native application no longer requires access to the hardware resource. In other embodiments, the computer implemented method 400 may include utilizing an operating system (OS) service executed by the host processor to: (a) transfer the request from the web browser extension to the kernel-mode virtual driver, and (b) transfer the handle from the kernel-mode virtual driver to the web browser extension.

In other embodiments, the computer implemented method 400 may include communicating with the specific software driver to initiate an action on the specific hardware resource and control security for the action. In one example embodiment, the computer implemented method 400 may include: collecting contextual information from the IHS and controlling security for the action based on the contextual information. In another example embodiment, the computer implemented method 400 may include using the platform capabilities provided within the IHS to control security for the action.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the present disclosure may be adaptable to various modifications and alternative forms, specific embodiments have been shown by way of example and described herein. However, it should be understood that the present disclosure is not intended to be limited to the particular forms disclosed. Rather, the present disclosure is to cover all modifications, equivalents, and alternatives falling within the spirit and scope of the present disclosure as defined by the appended claims. Moreover, the different aspects of the disclosed systems and methods may be utilized in various combinations and/or independently. Thus, the present disclosure is not limited to only those combinations shown herein, but rather may include other combinations.

What is claimed is:

1. An information handling system (IHS) having a host processor, the IHS comprising:
   a web browser executable by the host processor to access a cloud-native application running on a remote system communicatively coupled to the IHS via a network;
   a web browser extension executable by the host processor to collect information about the cloud-native application, wherein the information collected by the web browser extension identifies the cloud-native application and a hardware resource requested by the cloud-native application; and
   an operating system (OS) kernel-mode virtual driver executed by the host processor to:
      discover hardware resources and platform capabilities provided within the IHS;
      receive a request from the web browser extension to access the hardware resource requested by the cloud-native application; and
      provide the web browser access to a specific hardware resource within the IHS that corresponds to the hardware resource requested by the cloud-native application.

2. The information handling system of claim 1, wherein the OS kernel-mode virtual driver is further executable by the host processor to:
   generate handles to software drivers that control the hardware resources provided within the IHS; and
   provide a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application.

3. The information handling system of claim 2, further comprising an operating system (OS) service executed by the host processor to: (a) transfer the request from the web browser extension to the OS kernel-mode virtual driver, and (b) transfer the handle from the kernel-mode virtual driver to the web browser extension.

4. The information handling system of claim 2, wherein the OS kernel-mode virtual driver is further executable by the host processor to communicate with the specific software driver to initiate an action on the specific hardware resource and control security for the action.

5. An information handling system (IHS) having a host processor, the IHS comprising:
   a web browser executable by the host processor to access a cloud-native application running on a remote system communicatively coupled to the IHS via a network;
   a web browser extension executable by the host processor to collect information about the cloud-native application, wherein the information collected by the web browser extension identifies the cloud-native application and a hardware resource requested by the cloud-native application; and
   a kernel-mode virtual driver executed by the host processor to:
      discover hardware resources and platform capabilities provided within the IHS;
      receive a request from the web browser extension to access the hardware resource requested by the cloud-native application; and
      provide the web browser access to a specific hardware resource within the IHS that corresponds to the hardware resource requested by the cloud-native application;
   wherein the kernel-mode virtual driver is further executable by the host processor to:
      generate handles to software drivers that control the hardware resources provided within the IHS; and
      provide a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application; and
   wherein the web browser extension destroys the handle provided by the kernel-mode virtual driver when the cloud-native application no longer requires access to the hardware resource.

6. An information handling system (IHS) having a host processor, the IHS comprising:
   a web browser executable by the host processor to access a cloud-native application running on a remote system communicatively coupled to the IHS via a network;
   a web browser extension executable by the host processor to collect information about the cloud-native application, wherein the information collected by the web browser extension identifies the cloud-native application and a hardware resource requested by the cloud-native application; and
   a kernel-mode virtual driver executed by the host processor to:
      discover hardware resources and platform capabilities provided within the IHS;
      receive a request from the web browser extension to access the hardware resource requested by the cloud-native application; and provide the web browser access to a specific hardware resource within the IHS that corresponds to the hardware resource requested by the cloud-native application;

wherein the kernel-mode virtual driver is further executable by the host processor to:
generate handles to software drivers that control the hardware resources provided within the IHS; and
provide a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application;

where the information handling system further comprises an operating system (OS) service executed by the host processor to: (a) transfer the request from the web browser extension to the OS kernel-mode virtual driver, and (b) transfer the handle from the kernel-mode virtual driver to the web browser extension; and wherein the OS service uses interprocess communication (IPC) messages to: (a) transfer the request from the web browser extension to the kernel-mode virtual driver, and (b) transfer the handle from the kernel-mode virtual driver to the web browser extension.

7. An information handling system (IHS) having a host processor, the IHS comprising:
a web browser executable by the host processor to access a cloud-native application running on a remote system communicatively coupled to the IHS via a network;
a web browser extension executable by the host processor to collect information about the cloud-native application, wherein the information collected by the web browser extension identifies the cloud-native application and a hardware resource requested by the cloud-native application; and
a kernel-mode virtual driver executed by the host processor to:
discover hardware resources and platform capabilities provided within the IHS;
receive a request from the web browser extension to access the hardware resource requested by the cloud-native application;
provide the web browser access to a specific hardware resource within the IHS that corresponds to the hardware resource requested by the cloud-native application;
generate handles to software drivers that control the hardware resources provided within the IHS;
provide a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application; and
communicate with the specific software driver to initiate an action on the specific hardware resource and control security for the action, wherein the kernel-mode virtual driver is further executable by the host processor to control security for the action based on contextual information collected from the IHS.

8. The information handling system of claim 7, wherein the contextual information collected from the IHS comprises one or more of the following: location information, user information, performance information, and network resource information.

9. An information handling system (IHS) having a host processor, the IHS comprising:
a web browser executable by the host processor to access a cloud-native application running on a remote system communicatively coupled to the IHS via a network;
a web browser extension executable by the host processor to collect information about the cloud-native application, wherein the information collected by the web browser extension identifies the cloud-native application and a hardware resource requested by the cloud-native application; and
a kernel-mode virtual driver executed by the host processor to:
discover hardware resources and platform capabilities provided within the IHS;
receive a request from the web browser extension to access the hardware resource requested by the cloud-native application;
provide the web browser access to a specific hardware resource within the IHS that corresponds to the hardware resource requested by the cloud-native application;
generate handles to software drivers that control the hardware resources provided within the IHS;
provide a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application; and
communicate with the specific software driver to initiate an action on the specific hardware resource and control security for the action, wherein the kernel-mode virtual driver is further executable by the host processor to use the platform capabilities provided within the IHS to control security for the action.

10. The information handling system of claim 9, wherein the platform capabilities comprise one or more of the following: a trusted platform module (TPM) and a converged security and management engine (CSME).

11. A computer implemented method performed by a host processor of an information handling system (IHS), and wherein the computer implemented method comprises:
accessing, via a web browser executed by the host processor, a cloud-native application running on a remote system communicatively coupled to the IHS via a network;
collecting, via a web browser extension executed by the host processor, information about the cloud-native application, wherein the information identifies the cloud-native application and a hardware resource requested by the cloud-native application;
discovering hardware resources and platform capabilities provided within the IHS;
receiving a request from the web browser extension to access the hardware resource requested by the cloud-native application; and
providing the web browser access to a specific hardware resource within the IHS that corresponds to the hardware resource requested by the cloud-native application;

wherein said discovering, receiving and providing are performed by an operating system (OS) kernel-mode virtual driver executed by the host processor.

12. The computer implemented method of claim 11, wherein said providing the web browser access to a specific hardware resource within the IHS that corresponds to the hardware resource requested by the cloud-native application comprises:
   generating handles to software drivers that control the hardware resources provided within the IHS; and
   providing a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application.

13. The computer implemented method of claim 12, further comprising utilizing an operating system (OS) service executed by the host processor to: (a) transfer the request from the web browser extension to the OS kernel-mode virtual driver, and (b) transfer the handle from the OS kernel-mode virtual driver to the web browser extension.

14. The computer implemented method of claim 12, further comprising communicating with the specific software driver to initiate an action on the specific hardware resource and control security for the action.

15. A computer implemented method performed by a host processor of an information handling system (IHS), and wherein the computer implemented method comprises:
   accessing, via a web browser executed by the host processor, a cloud-native application running on a remote system communicatively coupled to the IHS via a network;
   collecting, via a web browser extension executed by the host processor, information about the cloud-native application, wherein the information identifies the cloud-native application and a hardware resource requested by the cloud-native application;
   discovering hardware resources and platform capabilities provided within the IHS;
   receiving a request from the web browser extension to access the hardware resource requested by the cloud-native application; and
   providing the web browser access to a specific hardware resource within the IHS that corresponds to the hardware resource requested by the cloud-native application;
   wherein said providing the web browser access to a specific hardware resource within the IHS that corresponds to the hardware resource requested by the cloud-native application comprises:
      generating handles to software drivers that control the hardware resources provided within the IHS; and
      providing a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application; and
   where the method further comprises destroying the handle provided to the web browser when the cloud-native application no longer requires access to the hardware resource.

16. A computer implemented method performed by a host processor of an information handling system (IHS), and wherein the computer implemented method comprises:
   accessing, via a web browser executed by the host processor, a cloud-native application running on a remote system communicatively coupled to the IHS via a network;
   collecting, via a web browser extension executed by the host processor, information about the cloud-native application, wherein the information identifies the cloud-native application and a hardware resource requested by the cloud-native application;
   discovering hardware resources and platform capabilities provided within the IHS;
   receiving a request from the web browser extension to access the hardware resource requested by the cloud-native application;
   providing the web browser access to a specific hardware resource within the IHS that corresponds to the hardware resource requested by the cloud-native application by:
      generating handles to software drivers that control the hardware resources provided within the IHS; and
      providing a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application;
   communicating with the specific software driver to initiate an action on the specific hardware resource and control security for the action;
   collecting contextual information from the IHS; and
   controlling security for the action based on the contextual information.

17. The computer implemented method of claim 16, wherein said collecting contextual information from the IHS comprises collecting one or more of the following: location information, user information, performance information, and network resource information.

18. A computer implemented method performed by a host processor of an information handling system (IHS), and wherein the computer implemented method comprises:
   accessing, via a web browser executed by the host processor, a cloud-native application running on a remote system communicatively coupled to the IHS via a network;
   collecting, via a web browser extension executed by the host processor, information about the cloud-native application, wherein the information identifies the cloud-native application and a hardware resource requested by the cloud-native application;
   discovering hardware resources and platform capabilities provided within the IHS;
   receiving a request from the web browser extension to access the hardware resource requested by the cloud-native application;
   providing the web browser access to a specific hardware resource within the IHS that corresponds to the hardware resource requested by the cloud-native application by:
      generating handles to software drivers that control the hardware resources provided within the IHS; and
      providing a handle to the web browser, via the web browser extension, for accessing the hardware resource requested by the cloud-native application, wherein the handle provides a data path to access a specific software driver, which controls the specific hardware resource within the IHS that corresponds to the hardware resource requested by the cloud-native application;

communicating with the specific software driver to initiate an action on the specific hardware resource and control security for the action; and using the platform capabilities provided within the IHS to control security for the action.

19. The computer implemented method of claim 18, wherein the platform capabilities comprise one or more of the following: a trusted platform module (TPM) and a converged security and management engine (CSME).

* * * * *